United States Patent [19]
Vogt

[11] Patent Number: 4,779,116
[45] Date of Patent: Oct. 18, 1988

[54] EXPOSURE-MEASURING ELEMENT AND DEVICE

[76] Inventor: Philippe Vogt, Frohalpstrasse 65, CH-8038 Zurich, Switzerland

[21] Appl. No.: 915,068

[22] PCT Filed: Jan. 21, 1986

[86] PCT No.: PCT/CH86/00008
§ 371 Date: Sep. 16, 1986
§ 102(e) Date: Sep. 16, 1986

[87] PCT Pub. No.: WO86/04427
PCT Pub. Date: Jul. 31, 1986

[30] Foreign Application Priority Data
Jan. 21, 1985 [DE] Fed. Rep. of Germany ....... 3501806

[51] Int. Cl.[4] ............................................... G03B 7/099
[52] U.S. Cl. ...................... 354/432; 354/477
[58] Field of Search ............... 354/432, 476, 477, 478, 354/199, 161, 200, 201, 219, 224, 225

[56] References Cited

U.S. PATENT DOCUMENTS

| | | | |
|---|---|---|---|
| 856,618 | 6/1907 | Brownell | 354/161 |
| 3,471,704 | 10/1969 | Koch | 354/477 |
| 3,620,147 | 11/1971 | Ataka et al. | 354/477 |
| 4,047,187 | 9/1977 | Mashimo et al. | 354/432 X |
| 4,104,651 | 8/1978 | Matsumoto et al. | 354/201 X |
| 4,130,355 | 12/1978 | Ohtaki et al. | 354/412 |

FOREIGN PATENT DOCUMENTS

| | | |
|---|---|---|
| 1210318 | 7/1961 | Fed. Rep. of Germany . |
| 1952553 | 4/1971 | Fed. Rep. of Germany . |
| 2559559 | 4/1975 | Fed. Rep. of Germany . |
| 1210319 | 11/1986 | Fed. Rep. of Germany . |
| 1132293 | 3/1957 | France . |
| 2324208 | 8/1977 | France . |
| 2532072 | 2/1984 | France . |
| 6324 | 1/1980 | Japan ................................. 354/477 |
| 32031 | 2/1985 | Japan ................................. 354/476 |
| 120334 | 6/1985 | Japan ................................. 354/478 |
| 1109071 | 4/1968 | United Kingdom . |

OTHER PUBLICATIONS

L. Andrew Mannbeim, "Look What's Happening to Large-Format Cameras!", Canadian Photography, June 1979, pp. 27 and 29-32.

Primary Examiner—W. B. Perkey
Attorney, Agent, or Firm—Ostrolenk, Faber, Gerb & Soffen

[57] ABSTRACT

An exposure measuring element contains a frosted glass plate and photoelectric transducers whose connections are led out via an arrangement of conductors to a contact arrangement on the edge of the frosted glass plate. The measuring element is part of an exposure measuring system which has an evaluation device for analyzing and displaying the signals generated by the photoelectric transducers. The average brightness range for a photograph can be determined with a single measurement by this device.

8 Claims, 1 Drawing Sheet

EXPOSURE-MEASURING ELEMENT AND DEVICE

BACKGROUND AND SUMMARY OF THE INVENTION

The present invention concerns an exposure measuring element and an exposure device having such an element.

From Swiss Pat. No. 440,747 an exposure-measuring device is known which has a bar-shaped housing, one end portion of which is provided with front and rear window openings and with a photoelectric transducer which is movable into active position in front of the rear window opening while its other end portion is arranged for manipulating the device. The device can have means for swinging itself into the surface of a frosted glass plate.

Upon use, the end portion of the housing having the window openings is brought directly in front of or behind the frosted glass plate.

In the case of measurement in front of the frosted glass plate, the plane of the frosted glass plate is defocused as in the case of the known measurement cassette, so that refocusing is necessary upon each measurement. In the case of measurement behind the frosted glass plate, the measurement, which is dependent on the scattering angle of the frosted glass plate, is falsified.

The present invention is directed at remedying this. The invention, as characterized in the claims, solves the problem of creating an exposure-measuring device in which the measurement of the light takes place in the film plane and in which the handling of separate devices is unnecessary.

The advantages which can be obtained by the invention reside in the fact that a selective point-measurement or a differentiated integral measurement can be effected in the film plane, that a selective multi-point measurement can be carried out instead of a wide-field measurement, and that the average brightness range of the photograph can result from a single measurement.

BRIEF DESCRIPTION OF THE DRAWINGS

Other features and advantages will become evident from the following description of one embodiment of the invention, with reference to the accompanying drawing, in which.

DESCRIPTION OF THE PREFERRED EMBODIMENTS

Figure 1:
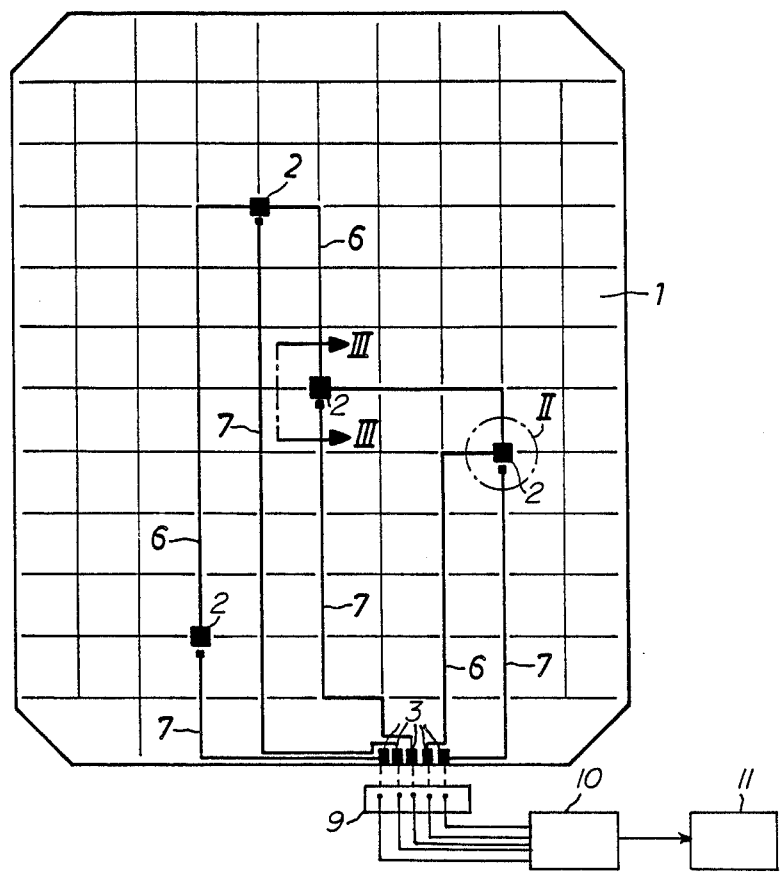
FIG. 1 is a front view of an exposure-measuring element.
Figure 3:
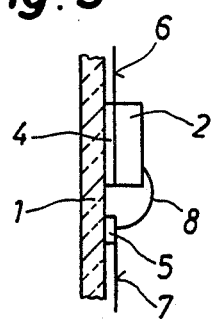
FIG. 3 is a section along the line III—III of FIG. 1.
Figure 2:
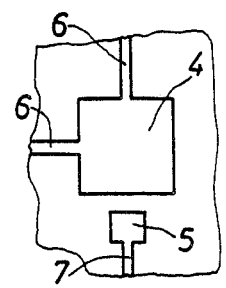
FIG. 2 shows, on a larger scale, a detail of the area of the device shown in FIG. 1 enclosed by a circle II, but with a photoelectric transducer removed.

FIG. 1 shows an exposure measuring element which contains a known frosted glass plate 1, four photoelectric transducers 2 and a conductor arrangement. Transducers 2 are each localized in shape, as opposed to elongated. The conductor arrangement comprises contact elements 3 which are formed near the edge of one narrow side of the frosted glass plate. Connection regions 4 and 5, shown in FIGS. 2 and 3, are provided for the photoelectric transducers. Conductive paths 6 and 7 connect the connection regions 4 and 5 to the corresponding contact elements 3. The conductor arrangement consists of electrically conductive layers which are applied to the frosted side of glass plate 1.

As shown in FIG. 2, the connection regions 4, 5 for the photoelectric transducers 2 are of different dimensions. The connection regions 4, which has the larger surface, is developed as a contact surface on which a photoelectric transducer 2 is so fastened that it is connected in electrically conductive manner to it. A bond wire 8 is welded at one end to transducer 2, and at another end to the other connecting region 5 beneath. As indicated in FIG. 1, the contact surfaces 4 the individual photoelectric transducers 2 (see FIG. 3) 2 are together connected by conductive paths 6 to one contact element 3 while the connection regions 5 of smaller area are connected individually via separate conductive paths 7 to respective contact elements 3. Formation of the connecting regions 4, 5 and of the conductive paths 6, 7 is known. The connecting regions 4, 5 and the conductive paths 6, 7 for instance could consist of a first layer of copper, a second layer of nickel and a third layer of bonded gold without brightener.

The exposure measuring element can be inserted into a camera, with the contact elements 3 engaging a multiple contact strip 9, shown in schematic form. The contact strip 9 is electrically connected to an evaluation device 10, shown in block form. The evaluation device 10 can have a microprocessor which receives and analyzes the signals given off by the individual photoelectric transducers 2, to provide a measurement of average brightness observed by the plurality of transducers 2. The output signals of the microprocessor can then be displayed on a display device 11, shown in block form.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

I claim:

1. An exposure measuring system for a camera providing a single, multi-point measurement of brightness, comprising:

an image viewing plate insertable into the imaging ray path of a camera and having a plurality of edges;

a plurality of non-elongated photoelectric transducers supported on the viewing plate, the transducers being selected in number and arranged to provide a selective multi-point brightness measurement;

a plurality of conductive pathways on the viewing plate connecting the photoelectric transducers to respective pathway terminations along an interconnect region on a single edge of the plate;

the plurality of photoelectric transducers being sufficiently small in number that the interconnect region can be removably inserted into a contact receptacle with a respective external conductor for each pathway termination;

the conductive pathways being arranged so that each photoelectric transducer can be individually addressed by a respective signal applied to its associated conductive pathway termination; and an evaluation device connected to the pathway terminations for making, in a single measurement, a selective, multi-point measurement of brightness observed by the plurality of transducers.

2. The exposure measuring system of claim 1, wherein the photoelectric transducers comprise semiconductor elements.

3. The exposure measuring system of claim 1, wherein the image viewing plate comprises a plate of glass with a coating of frost on one side, and the transducers are supported on the frosted side.

4. The exposure measuring system of claim 1, wherein the evaluation device includes means for measuring average brightness observed by the plurality of photoelectric transducers.

5. The exposure measuring system of claim 1, wherein the photoelectric transducers are arranged in a predetermined pattern spaced a substantial distance inwardly on the plate from the edges of the plate.

6. The exposure measuring system of claim 5, wherein the number of transducers is four; one transducer being located approximately at the center of the plate and the other three being located at the apices of a triangle that is substantially centered about the foregoing one transducer.

7. The exposure measuring system of claim 1, wherein the image viewing plate is arranged to be placed in a film plane of the camera in isolation from any optical lens.

8. The exposure measuring system of claim 1, wherein the photoelectric transducers all exhibit the same type of electrical response to light.

* * * * *